(12) United States Patent
Lee et al.

(10) Patent No.: US 10,308,245 B2
(45) Date of Patent: Jun. 4, 2019

(54) VEHICLE AND METHOD FOR CONTROLLING THEREOF

(71) Applicant: HYUNDAI MOTOR COMPANY, Seoul (KR)

(72) Inventors: Taeyoung Lee, Yongin-si (KR); Donghyun Sung, Hwaseong-si (KR); Junghyun Kim, Seoul (KR); Sangmin Lee, Seoul (KR); Eungseo Kim, Suwon-si (KR); Yongseok Kwon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/455,408

(22) Filed: Mar. 10, 2017

(65) Prior Publication Data

US 2018/0162386 A1 Jun. 14, 2018

(30) Foreign Application Priority Data

Dec. 9, 2016 (KR) .......................... 10-2016-0167453

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0953* (2013.01); *B60W 30/0956* (2013.01); *G08G 1/166* (2013.01); *B60W 2420/52* (2013.01); *B60W 2520/10* (2013.01); *B60W 2550/10* (2013.01); *B60W 2720/106* (2013.01)

(58) Field of Classification Search
None
See application file for complete search history.

(56) References Cited

U.S. PATENT DOCUMENTS

| 9,227,632 | B1* | 1/2016 | Lee .................. B60W 30/0953 |
| 9,229,453 | B1* | 1/2016 | Lee ....................... G05D 1/0214 |
| 9,487,195 | B2* | 11/2016 | Fujishiro ............... B60W 10/18 |
| 2013/0286205 | A1* | 10/2013 | Okada ...................... H04N 7/18 348/148 |
| 2015/0232073 | A1* | 8/2015 | Fujishiro ................... B60T 7/22 701/70 |
| 2015/0298692 | A1* | 10/2015 | Minemura ............ B60W 30/08 701/70 |
| 2016/0335892 | A1* | 11/2016 | Okada ........................ B60T 7/22 |
| 2017/0232964 | A1* | 8/2017 | Moritani ................... B60T 7/22 701/70 |

* cited by examiner

*Primary Examiner* — Thomas G Black
*Assistant Examiner* — Demetra R Smith-Stewart
(74) *Attorney, Agent, or Firm* — Morgan Lewis & Bockius LLP

(57) ABSTRACT

A vehicle includes: a sensor configured to detect an object moving in front of the vehicle; a controller configured to determine a longitudinal driving time taken for the vehicle to drive to the object, and configured to transmit a deceleration avoidance control signal gradually reducing a driving speed of the vehicle so that the vehicle is stopped before colliding with the object or a cross avoidance control signal stopping the vehicle until the object escapes from a driving lane of the vehicle, based on the longitudinal driving time and a transverse moving time of the object; and a speed regulator configured to regulate the driving speed of the vehicle in response to the transmitted control signal.

24 Claims, 12 Drawing Sheets

VEHICLE AND METHOD FOR CONTROLLING THEREOF

CROSS-REFERENCE TO RELATED APPLICATION(S)

This application claims the benefit of priority to Korean Patent Application No. 10-2016-0167453, filed on Dec. 9, 2016 in the Korean Intellectual Property Office, the disclosure of which is incorporated herein by reference.

TECHNICAL FIELD

The present disclosure relates to a vehicle and a method for controlling thereof, and more particularly, to a technology for variably applying a collision avoidance control strategy between a vehicle and a bicycle according to a time to collision and an expected collision position between the vehicle and the bicycle when an object detected by the vehicle is the bicycle.

BACKGROUND

A vehicle is configured to transport an object, such as people and goods, to a destination while driving on the road. The vehicle may be capable of moving to a variety of positions by using one and more wheels installed in a body of the vehicle. The vehicle may include three-wheeled, four-wheeled vehicle, a two-wheeled vehicle, such as a motorcycle, construction equipment, a bicycle or a train traveling on the rails disposed on the line.

In modern society, the vehicle is the most common means of transportation, and the number of people using it has been increased. Due to the development of vehicle technology, driving in a long distance has been easier and vehicle life has been increased. However, the traffic congestion has been getting worse due to the deterioration of road traffic in a high density area.

In recent years, a research has been actively carried out for a vehicle equipped with an advanced driver assist system (ADAS) that actively provides information about a vehicle condition, a driver condition, and the surrounding environment in order to reduce the burden on the driver and improve the convenience.

An example of advanced driver assistance systems that are mounted on the vehicle includes a forward collision avoidance (FCA) system, and an autonomous emergency brake (AEB) system. The forward collision avoidance (FCA) system and the autonomous emergency brake (AEB) system may be operated by determining a risk of collision with a counter vehicle or a crossing vehicle and by performing an emergency braking in a collision situation.

In order to implement the collision avoidance system, it may be required to detect an object in front of the vehicle and acquire information of the object by using a sensor provided in the vehicle, and in recent, the need for technology has emerged for implementing a stable and effective collision avoidance by variably applying a control strategy for avoiding collision between the vehicle and the object according to the type of the detected object.

SUMMARY

An aspect of the present disclosure provides a vehicle and a method for controlling thereof that can variably apply a collision avoidance control strategy between a vehicle and a bicycle according to a time to collision and an expected collision position between the vehicle and the bicycle when an object detected by the vehicle is the bicycle.

Additional aspects of the present disclosure will be set forth in part in the description which follows and, in part, will be obvious from the description, or may be learned by practice of the present disclosure.

In accordance with an exemplary embodiment of the present disclosure, a vehicle includes: a sensor configured to detect an object moving in front of a vehicle; a controller configured to determine a longitudinal driving time taken for the vehicle to drive to the object, and configured to transmit a deceleration avoidance control signal gradually reducing a driving speed of the vehicle so that the vehicle stops before colliding with the object or a cross avoidance control signal stopping the vehicle until the object escapes from a driving lane of the vehicle, based on the longitudinal driving time and a transverse moving time of the object; and a speed regulator configured to regulate the driving speed of the vehicle in response to the transmitted control signal.

The object may be a bicycle.

The controller may determine a first period of time, in which the bicycle moves in the transverse direction from when the bicycle is detected until a front portion of the bicycle enters the driving lane of the vehicle, as a first moving time.

The controller may determine a second period of time, in which the bicycle moves in the transverse direction from when the bicycle is detected until a driver position of the bicycle is placed in the center of the front surface of the vehicle, as a second moving time.

The controller may determine a third period of time, in which the bicycle moves in the transverse direction from when the bicycle is detected until a rear portion of the bicycle is placed in the center of the front surface of the vehicle, as a third moving time.

The controller may determine a fourth period of time, in which the bicycle moves in the transverse direction from when the bicycle is detected until the rear portion of the bicycle escapes from the driving lane of the vehicle, as a fourth moving time.

The controller may transmit the deceleration avoidance control when the determined longitudinal driving time of the vehicle exceeds the first moving time and is equal to or less than the second moving time.

The controller may transmit the deceleration avoidance control when the determined longitudinal driving time of the vehicle exceeds the second moving time and is equal to or less than the third moving time.

The controller may transmit the cross avoidance control when the determined longitudinal driving time of the vehicle exceeds the third moving time and is equal to or less than the fourth moving time.

The controller may calculate a time to collision (TTC) between the vehicle and the bicycle and transmits the deceleration avoidance control signal gradually reducing the driving speed of the vehicle, based on the calculated time to collision.

The controller may transmit the cross avoidance control signal configured to temporarily stop the vehicle with a predetermined amount of deceleration until the bicycle escapes from the driving lane of the vehicle.

The sensor may include any one of a radar and a Light Detection And Ranging (LiDAR), and acquires position information and speed information of the detected bicycle.

In accordance with another exemplary embodiment of the present disclosure, a method for controlling a vehicle includes: detecting, by a sensor, an object moving in front of a vehicle; determining, by a controller, a longitudinal driving time taken for the vehicle to drive to the object; transmitting, by the controller, a deceleration avoidance control signal configured to gradually reduce a driving speed of the vehicle so that the vehicle stops before colliding with the object or a cross avoidance control signal configured to stop the vehicle until the object escapes from a driving lane of the vehicle, based on the longitudinal driving time and a transverse moving time of the object; and regulating the driving speed of the vehicle in response to the transmitted control signal.

The object may be a bicycle.

A first period of time, in which the bicycle may move in the transverse direction from when the bicycle is detected until a front portion of the bicycle enters the driving lane of the vehicle, is determined as a first moving time.

A second period of time, in which the bicycle may move in the transverse direction from when the bicycle is detected until a driver position of the bicycle is placed in the center of the front surface of the vehicle, is determined as a second moving time.

A third period of time, in which the bicycle may move in the transverse direction from when the bicycle is detected until a rear portion of the bicycle is placed in the center of the front surface of the vehicle, is determined as a third moving time.

A fourth period of time, in which the bicycle may move in the transverse direction from when the bicycle is detected until a rear portion of the bicycle escapes from the driving lane of the vehicle, is determined as a fourth moving time.

The transmission of the deceleration avoidance control signal may be performed by transmitting the deceleration avoidance control when the determined longitudinal driving time of the vehicle exceeds the first moving time and is equal to or less than the second moving time.

The transmission of the deceleration avoidance control signal may be performed by transmitting the deceleration avoidance control when the determined longitudinal driving time of the vehicle exceeds the second moving time and is equal to or less than the third moving time.

The transmission of the cross avoidance control signal may be performed by transmitting the cross avoidance control when the determined longitudinal driving time of the vehicle exceeds the third moving time and is equal to or less than the fourth moving time.

The transmission of the deceleration avoidance control signal may be performed by calculating a time to collision between the vehicle and the bicycle and transmitting the deceleration avoidance control signal configured to gradually reduce the driving speed of the vehicle based on the calculated time to collision.

The transmission of the cross avoidance control signal may be performed by transmitting the cross avoidance control signal configured to temporarily stop the vehicle with a predetermined amount of deceleration until the bicycle escapes from the driving lane of the vehicle.

The detection of an object moving in front of a vehicle may include acquiring position information and speed information of the detected bicycle.

BRIEF DESCRIPTION OF THE DRAWINGS

These and/or other aspects of the disclosure will become apparent and more readily appreciated from the following description of embodiments.

DETAILED DESCRIPTION

Figure 1:
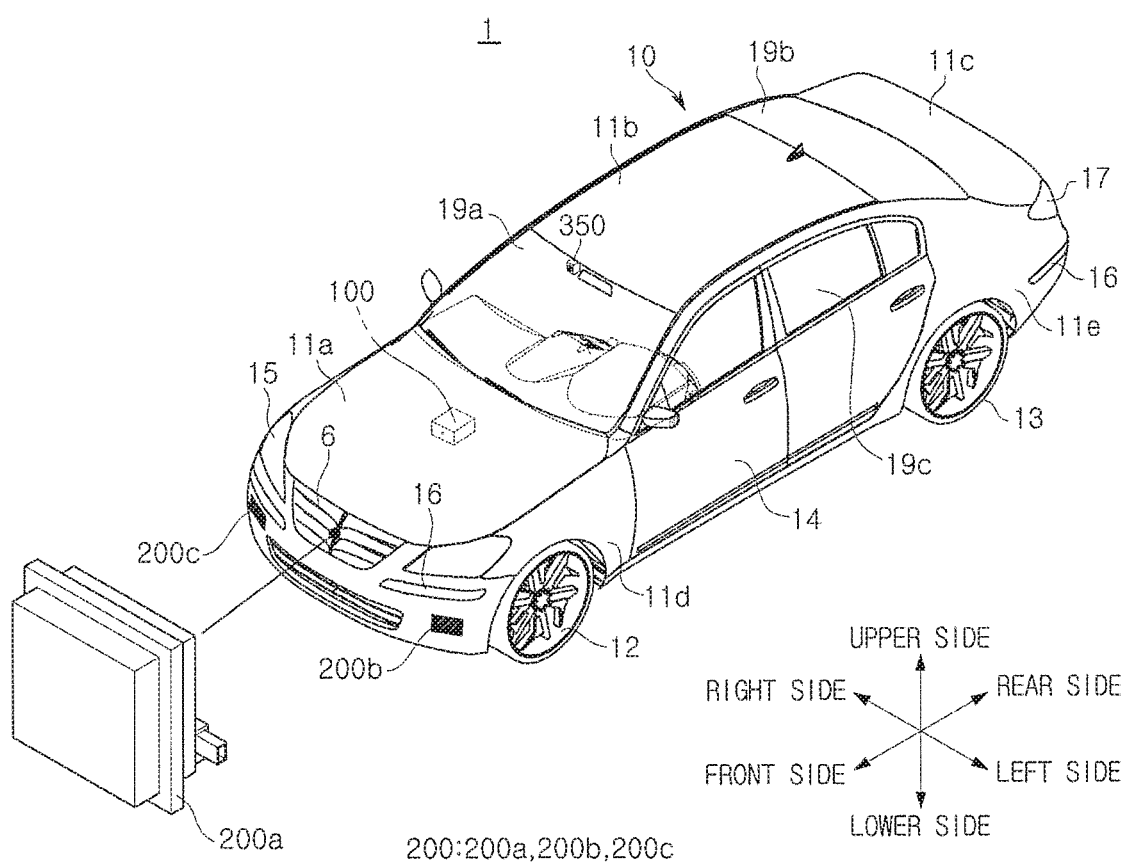
FIG. 1 is a perspective view schematically illustrating an appearance of a vehicle according to an embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

When a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
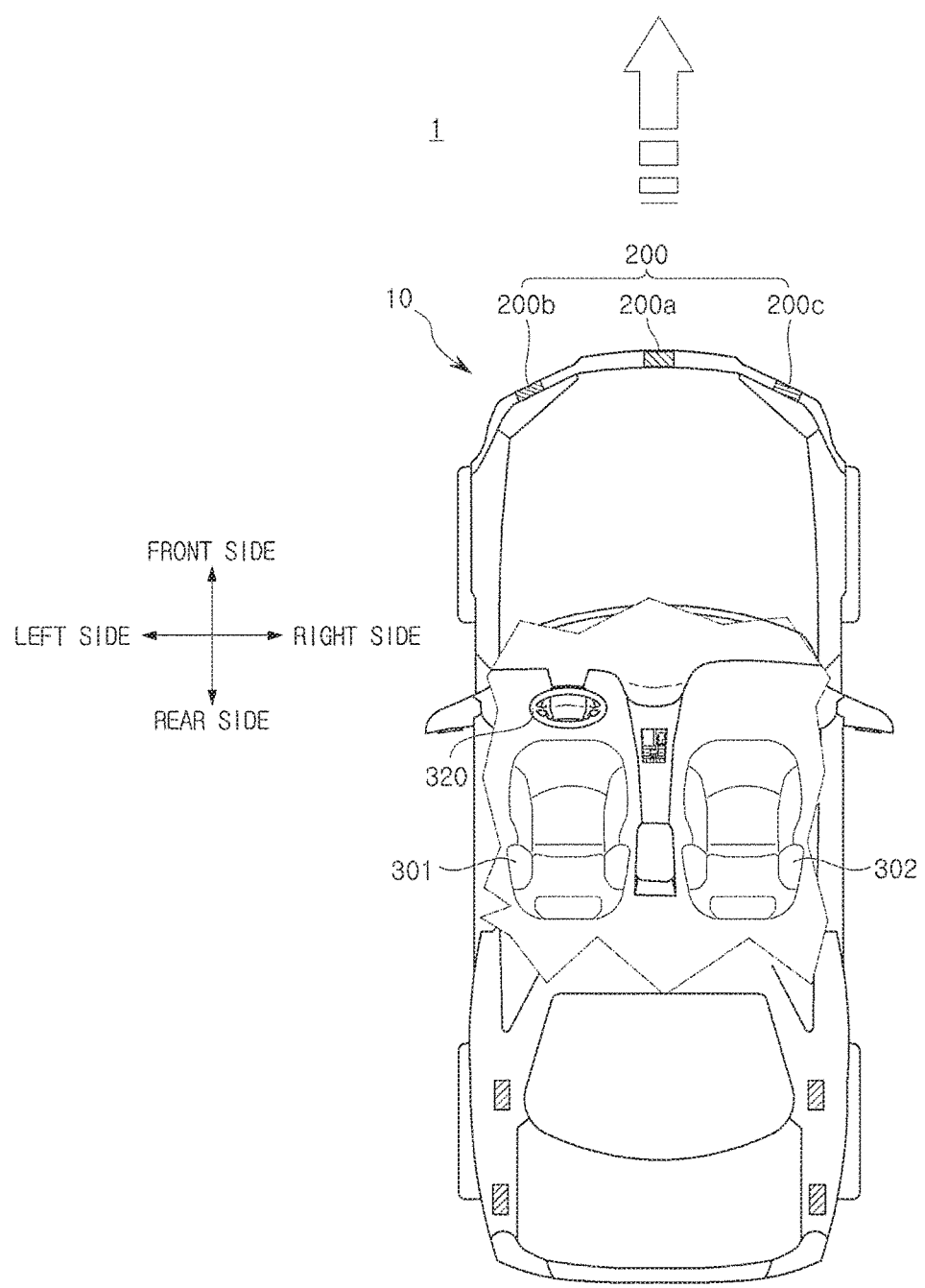
FIG. 2 is a view illustrating the vehicle having a sensor according to an embodiment of the present disclosure.
Figure 3:
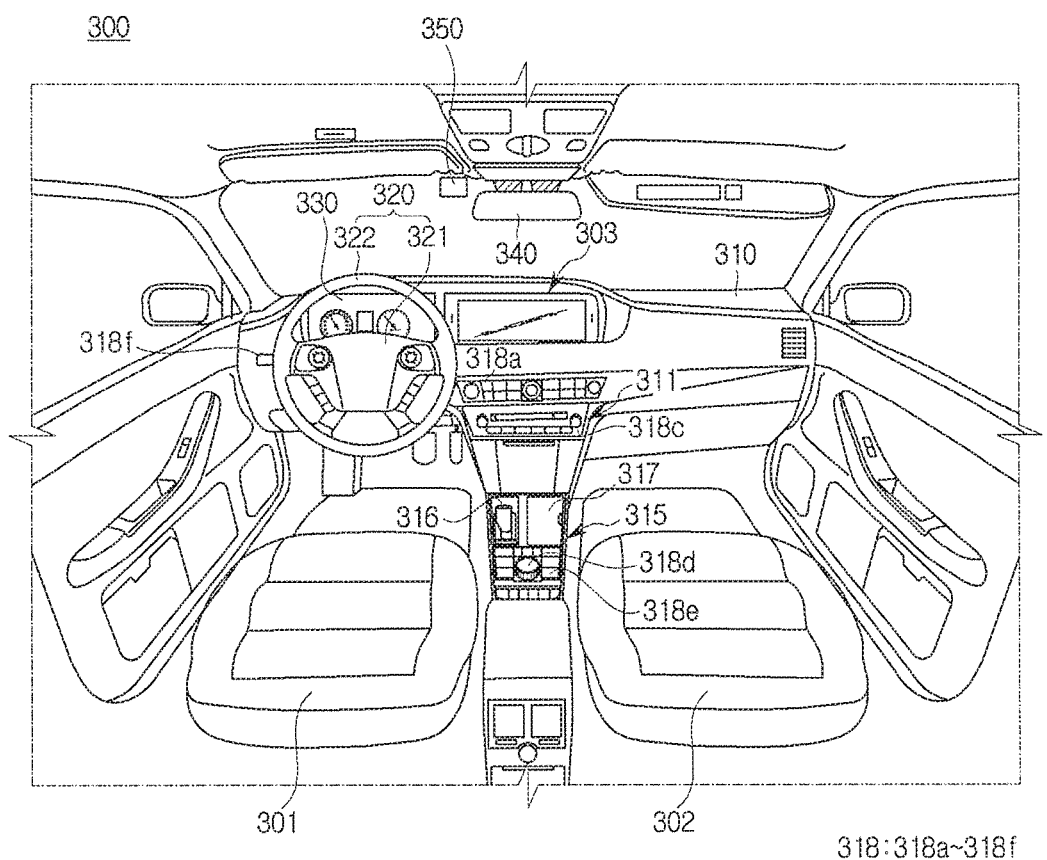
FIG. 3 is a view illustrating an interior structure of the vehicle according to an embodiment.
Figure 4:
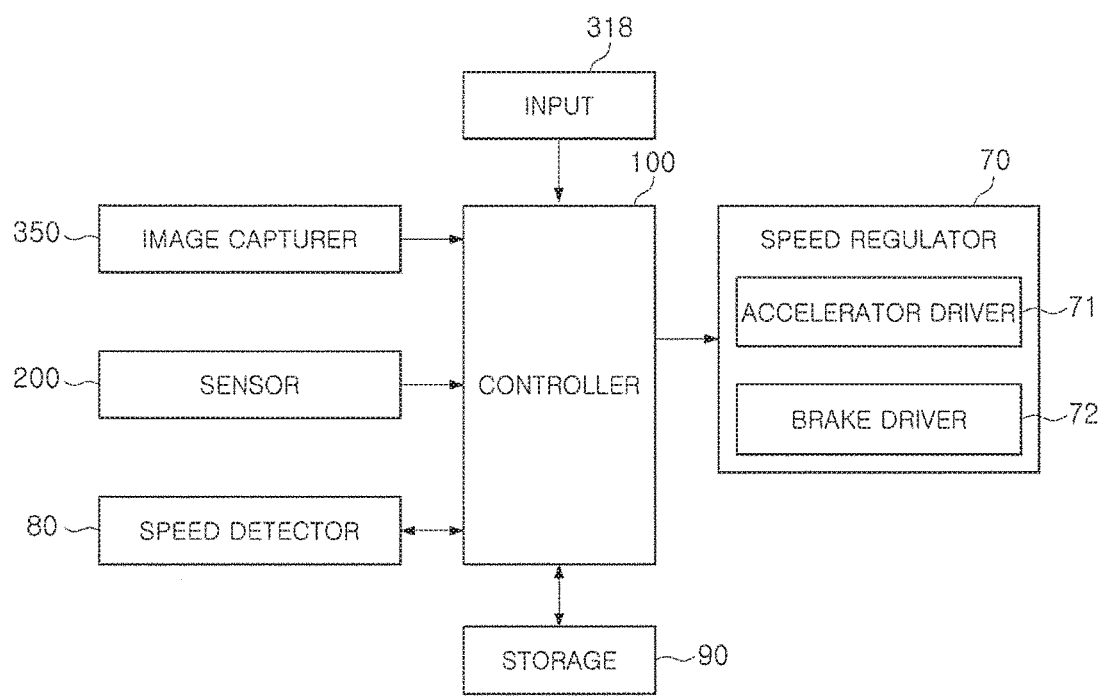
FIG. 4 is a control flow diagram illustrating the vehicle according to an embodiment of the present disclosure.

FIG. 1 is a perspective view schematically illustrating an appearance of a vehicle according to an embodiment of the present disclosure. FIG. 2 is a view illustrating the vehicle provided with a sensor according to an embodiment, FIG. 3 is a view illustrating an interior structure of the vehicle according to an embodiment, and FIG. 4 is a control flow diagram illustrating the vehicle according to an embodiment.

Hereinafter for convenience of description, as illustrated in FIG. 1, a direction in which a vehicle moves forward may be defined as a front side, and a left direction and a right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as a rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in a lateral side may be defined as a side surface. A side surface in the left direction may be defined as a left side surface and a side surface in the right direction may be defined as a right side surface.

Referring to FIG. 1, the vehicle 1 may include a body 10 forming an exterior of the vehicle 1, and a vehicle wheel 12 and 13 moving the vehicle 1.

The body 10 may include a hood 11a protecting a variety of devices, which are needed to drive the vehicle 1, e.g., an engine, a roof panel 11b forming an inner space, a trunk lid 11c provided with a storage space, a front fender 11d and a quarter panel 11e provided on the side surface of the vehicle 1. In addition, a plurality of doors 15 hinge-coupled to the body 10 may be provided on the side surface of the body 11.

Between the hood 11a and the roof panel 11b, a front window 19a may provide a view of the front side of the vehicle 1, and between the roof panel 11b and the trunk lid 11c, a rear window 19b may be provided to provide a view of the rear side of the vehicle 1. In addition, on the upper side of the door 15, a side window 19c may provide a view of the lateral side.

On the front side of the vehicle 1, a headlamp 15 emitting a light in a driving direction of the vehicle 1 may be provided.

On the front and rear side of the vehicle 1, a turn signal lamp 16 indicating a driving direction of the vehicle 1 may be provided.

The vehicle 1 may display a driving direction by flashing the turn signal lamp 16. On the rear side of the vehicle 1, a tail lamp 17 may be provided. The tail lamp 17 may be provided on the rear side of the vehicle 1 to display a gear shifting state and a brake operating state of the vehicle 1.

As illustrated in FIGS. 1 to 3, in the vehicle 1, at least one image capturer 350 may be provided. The image capturer 350 may capture images around the vehicle 1 during the vehicle 1 drives or stops, detect an object around the vehicle 1, and further acquire the type of the object and position information of the object. The object captured around the vehicle 1 may include another vehicle, a pedestrian, and a bicycle, and further include a moving object or a variety of stationary obstacles.

The image capturer 350 may capture an object around the vehicle 1 and detect the type of the object by identifying the shape of the captured object via image recognition, and transmit the detected information to a controller 100. Hereinafter, a method for controlling the vehicle 1 according to an embodiment will be described with a case in which an object detected around the vehicle 1 is a bicycle, as an example.

FIG. 3 illustrates that the image capturer 350 is provided adjacent to a room mirror 340, but is not limited thereto. Therefore, the image capturer 350 may be mounted to any position as long as capable of acquiring image information by capturing the inside or the outside of the vehicle 1.

The image capturer 350 may include at least one camera, and particularly include a three dimension (3D) space recognition sensor, a radar sensor, an ultrasonic wave sensor for capturing a precious image.

The 3D space recognition sensor may employ a KINECT (RGB-D sensor), a structured light sensor (time of flight (TOF) sensor) or a stereo camera, but is not limited thereto. Therefore, any other device having a similar function as the above mentioned function may be included.

Referring to FIGS. 1 and 2, in the vehicle 1, a sensor 200 configured to detect an object in front of the vehicle and acquire at least one of position information or driving speed information of the detected object.

Figure 5:
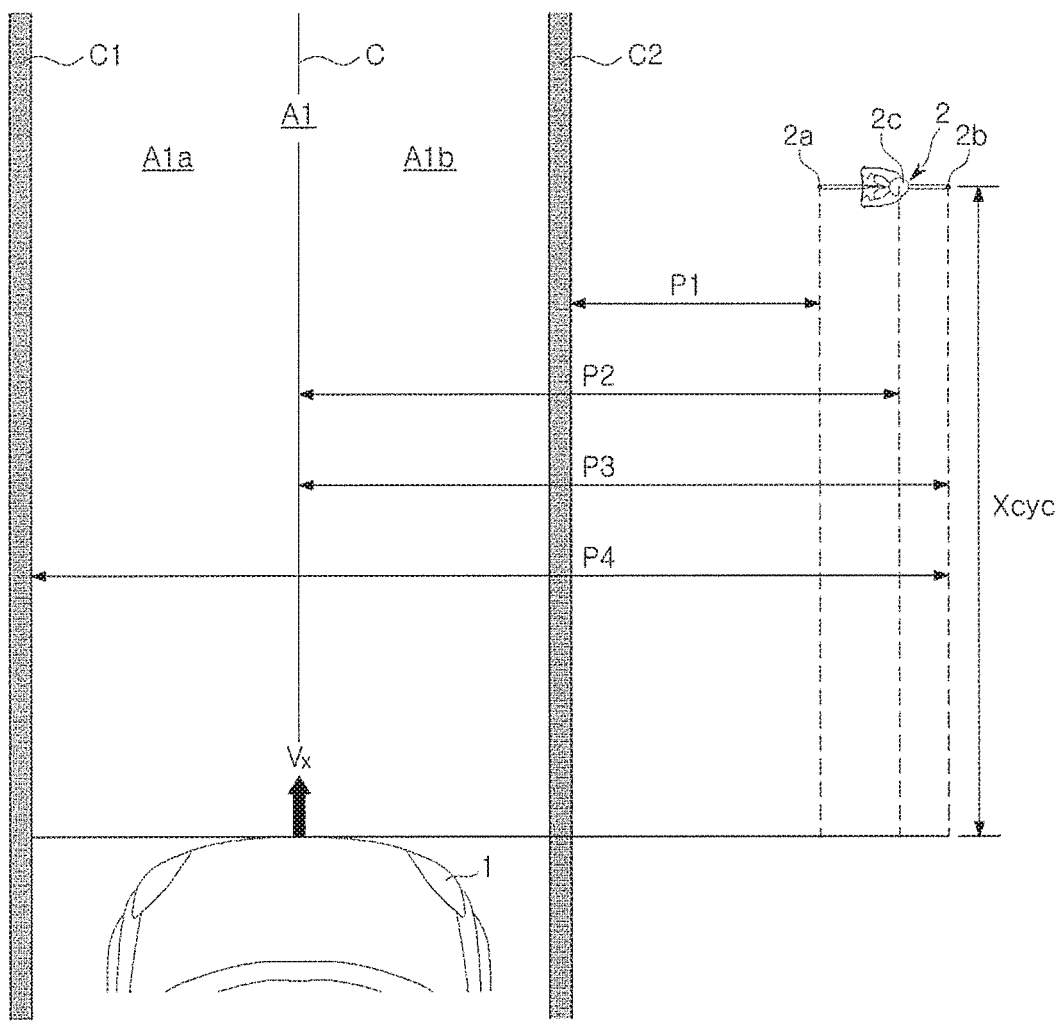
FIG. 5 is a view illustrating a case in which a sensor detects a bicycle placed in front of the vehicle and acquires position information and speed information of the bicycle according to an embodiment of the present disclosure.

FIG. 5 is a view illustrating a case in which a sensor detects a bicycle placed in front of the vehicle and acquires position information and speed information of the bicycle according to an embodiment.

According to an embodiment, the sensor 200 may acquire coordinate information of the bicycle 2 in front the vehicle 1. That is, the sensor 200 may acquire coordinate information, which is changed according to the movement of the bicycle 2, in real time, and may detect a transverse distance and a longitudinal distance ($X_{cyc}$) between the vehicle 1 and the bicycle 2.

That is, the sensor 200 may detect a position of a driver driving the bicycle 2 by detecting the bicycle 2, and acquire data related to a distance between the end of the front portion of the bicycle 2 and the vehicle 1 or a distance between the end of the rear portion of the bicycle 2 and the vehicle 1, with respect to the position of the driver of the bicycle 2.

Particularly, the sensor 200 may determine how far the end of the front portion of the bicycle 2 is apart from the position of the driver, based on length information of the bicycle 2, and also determine how far the end of the rear portion of the bicycle 2 is apart from the position of the driver, based on length information of the bicycle 2

Referring to FIG. 5, a driving lane (A1) on which the vehicle 1 drives may be divided into a left area (A1a) and a right area (A1b) about a center line (C) that is with respect to the center of the front surface portion of the vehicle 1.

The sensor 200 may acquire information about the transverse distance from the bicycle 2 to the driving lane (A1), and as illustrated in FIG. 5, the sensor 200 may acquire a distance in which the bicycle 2 moves in the transverse direction until the front portion (2a) of the bicycle 2 is placed in a right lane line (C2) of the driving lane (A1), before entering the driving lane (A1), as a first moving distance (P1).

Further, the sensor 200 may acquire a distance in which the bicycle 2 moves in the transverse direction until the driver position (2c) of the bicycle 2 is placed in the center line (C) with respect to the front surface portion of the vehicle 1, as a second moving distance (P2).

The sensor 200 may acquire a distance in which the bicycle 2 moves in the transverse direction until the rear portion (2b) of the bicycle 2 is placed in the center line (C) with respect to the front surface portion of the vehicle 1, as a third moving distance (P3).

The sensor 200 may acquire a distance in which the bicycle 2 moves in the transverse direction until the rear portion (2b) of the bicycle 2 is placed in a left lane line (C1) of the driving lane (A1), while escaping from the driving lane (A1), as a fourth moving distance (P4).

That is, during the vehicle 1 drives the longitudinal moving distance ($X_{cyc}$) to the bicycle 2 at a speed of $V_x$, in the driving lane (A1), the bicycle 2 may move toward the driving lane (A1) in the transverse direction and the sensor 200 of the vehicle 1 may acquire information about a moving speed of the bicycle 2 and a transverse moving distance of the bicycle 2 toward the driving lane (A1) by detecting the bicycle 2 in the movement.

As mentioned later, the controller 100 may estimate how far the bicycle 2 will move in the transverse direction during the vehicle 1 drives, based on the moving speed information and the transverse moving distance of the bicycle 2 acquired by the sensor 200, and determine a time to collision or an expected collision position between the bicycle 2 and the vehicle 1 based on the result of the estimation.

Alternatively, the sensor 200 may just detect the bicycle 2 in front of the vehicle 1 and then transmit the acquired detection information to the controller 100. The controller 100 may calculate moving speed information and position information of the detected bicycle 2, based on the received information.

As illustrated in FIGS. 1 and 2, the sensor 200 may be installed in a position that is appropriate to recognize an object, e.g. another vehicle, in the front, lateral or front lateral side. According to an embodiment, the sensor 200 may be installed in all of the front, the left and the right side of the vehicle 1 to recognize an object in all of the front side of the vehicle 1, a direction between the left side and the front side (hereinafter referred to as "left front side") of the vehicle 1 and a direction between the right side and the front side (hereinafter referred to as "right front side") of the vehicle 1.

For example, a first sensor 200a may be installed as a part of a radiator grill 6, e.g., inside of the radiator grill 6, or alternatively the first sensor 200a may be installed in any position of the vehicle 1 as long as capable of detecting another vehicle in the front side. A second sensor 200b may be installed in the left side surface of the vehicle 1, and a third sensor 200c may be installed in the right side surface of the vehicle 1.

The sensor 200 may determine whether another vehicle is present or is approaching in the left side, the right side, the front side, the rear side, the left front side, the right front side, the left rear side, or the right rear side, by using electromagnetic waves or laser light. For example, the sensor 200 may emit electromagnetic waves, e.g., microwaves or millimeter waves, pulsed laser light, ultrasonic waves, or infrared light, in the left side, the right side, the front side, the rear side, the left front side, the right front side, the left rear side, or the right rear side, receive pulsed laser light, ultrasonic waves, or infrared light, which are reflected or scatted by an object in the direction, and determine whether the object is placed. In this case, the sensor 200 may further determine a distance between the vehicle 1 and another object or a speed of another moving object, by using a return time of the radiated electromagnetic waves, pulsed laser light, ultrasonic waves, or infrared light.

According to embodiments, the sensor 200 may determine the presence of the object by receiving visible light that is reflected or scattered by the object in the left side, the right side, and the front side. As mentioned above, a recognition distance to another object placed in the front or rear side may vary according to using which one of the electromagnetic waves, the pulsed laser light, the ultrasonic waves, the infrared light or the visible light, and the weather or illumination may affect determining the presence of the object.

By using this, when the vehicle 1 drives in a certain direction along a certain lane, the controller 100 of the vehicle 1 may determine whether another object, which is moving while being present in the front side, the left front side and the right front side of the vehicle 1, is present or not, and acquire position information and speed information of the object.

The sensor 200 may be implemented by using a variety of devices, e.g., a radar using millimeter waves or microwaves, a light detection and ranging (LiDAR) using pulsed laser light, a vision sensor using visible light, an infrared sensor using infrared light, or an ultrasonic sensor using ultrasonic waves. The sensor 200 may be implemented by using any one of the radar, the light detection and ranging (LiDAR), the vision sensor, the infrared sensor, or the ultrasonic sensor or by combining them. When a plurality of sensors 200 is provided in a single vehicle 1, each of the sensor 200 may be implemented by using the same type of sensor or the different type of sensor. The implementation of the sensor 200 is not limited thereto, and the sensor 200 may be implemented by using a variety of devices and a combination thereof which is considered by a designer.

Referring to FIG. 3, in the interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components required for the driving is installed. The dashboard 310 may be provided in the front side of the driver seat 301 and the passenger seat 302. The dashboard 310 may include an upper panel, a center fascia 311 and a gear box 315.

In the upper panel of the dashboard 310, a display 303 may be installed. The display 303 may provide a variety of information to a driver or a passenger of the vehicle 1, as an image. For example, the display 303 may visually provide a variety of information, e.g., a map, weather, news, a variety of moving images or still images, and a variety of information related to conditions or operation of the vehicle 1, e.g., information about an air conditioning device. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used.

The display 303 may be installed in a housing that is integrally formed with the dashboard 310 to allow a display panel to be exposed to the outside. The display 303 may be installed in the center portion or a lower end of the center fascia 311, an inner surface of a windshield (not shown), or an upper surface of the dashboard 310, wherein the display 303 may be installed in the upper surface of the dashboard 310 by using a supporter (not shown). Alternatively, the display 303 may be installed in a variety of positions considered by the designer.

In the dashboard 310, a variety of devices, e.g., a processor, a communication module, a GPS reception module, and a storage, may be installed. The processor installed in the vehicle 1 may be configured to control electronics installed in the vehicle 1, and as mentioned above, the processor may be provided to perform functions of the controller 100. The above mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c to input a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d 318e may be provided. The input 318d to 318e may be implemented using a physical button, a knob, a touch pad, a touch screen, a stick-type operator or a track ball. The console 317 and the input 318d to 318e may be omitted according to the embodiment.

The steering wheel 320 and the instrument panel 330 may be provided in the direction of the driver seat in the dashboard 310.

The steering wheel 320 may be rotatable in a certain direction according to an operation of the driver, and the front vehicle wheel or the rear vehicle wheel of the vehicle 1 may be rotated according to the rotation direction of the steering wheel 320 so that the vehicle 1 is steered. In the steering wheel 320, a spoke 321 connected to a rotational shift and a handle wheel 322 coupled to the spoke 321 may be provided. In the spoke 321, an input means may be installed for inputting a variety of commands, and the input means may be implemented using a physical button, a knob, a touch pad, a touch screen, a stick-type operator, or a track ball. The handle wheel 322 may have a circular shape for the convenience of the driver, but is not limited thereto. A vibrator may be provided inside at least one of the spoke 321 and the handle wheel 322 and then the at least one of the spoke 321 and the handle wheel 322 may be vibrated with a certain intensity according to an external control. According to the embodiment, the vibrator 201 may be vibrated with various intensities in response to an external control signal, and thus the at least one of the spoke 321 and the handle wheel 322 may be vibrated with various intensities in response to the external control signal. The vehicle 1 may provide a haptic warning to the driver by using the vibrator 201. For example, the at least one of the spoke 321 and the handle wheel 322 may be vibrated with an intensity corresponding to a risk, which is determined when the vehicle 1 changes its lane, so as to provide a variety of warnings to the driver. Particularly, as the risk is higher, the at least one of the spoke 321 and the handle wheel 322 may be strongly vibrated so as to provide a high level warning to the driver.

In the rear side of the steering wheel 320, a turn signal indicator input 318f may be provided. A user may input a signal to change a driving direction or a lane via the turn signal indicator input 318f during driving the vehicle 1.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel according to embodiments. When the instrument panel 330 is implemented using the display panel, the instrument panel 330 may display more various information, e.g., fuel consumption, whether various devices mounted on the vehicle 1 are performed or not, as well as the above mentioned information, for the driver. According to the embodiment, the instrument panel 330 may output various warnings to the driver according to the risk of the vehicle 1. Particularly, the instrument panel 330 may provide various warnings to the driver according to the determined risk when the vehicle 1 changes a lane.

Referring to FIG. 4, according to an embodiment, the vehicle 1 may include a speed regulator 70 configured to regulate a driving speed of the vehicle 1 driven by the driver, a speed detector 80 configured to detect a driving speed of the vehicle 1, the storage 90 configured to store data related to the control of the vehicle 1, and the controller 100 configured to control each component of the vehicle 1 and the driving speed of the vehicle 1.

The speed regulator 70 may regulate a speed of the vehicle 1 driven by a driver. The speed regulator 70 may include an accelerator driver 71 and a brake driver 72.

The accelerator driver 71 may increase a speed of the vehicle 1 by driving the accelerator in response to a control signal of the controller 100, and the brake driver 72 may reduce a speed of the vehicle 1 by driving the brake in response to a control signal of the controller 100.

The controller 100 may increase or reduce the driving speed of the vehicle 1 so that a distance between the vehicle 1 and another object is increased or reduced based on a distance between the vehicle 1 and another object and a predetermined reference distance stored in the storage 90.

In addition, the controller 100 may calculate the time to collision between the vehicle 1 and the object based on the relative distance and the relative speed between the vehicle 1 and the object, and transmit a signal, which is configured to control a driving speed of the vehicle 1 based on the calculated time to collision, to the speed regulator 70.

The speed regulator 70 may regulate the driving speed of the vehicle 1 under the control of the controller 100, and may reduce the driving speed of the vehicle 1 when the risk of collision between the vehicle 1 and another vehicle is high.

The speed detector 80 may detect a driving speed of the vehicle 1 driven by the driver under the control of the controller 100. That is, the speed detector 80 may detect the driving speed of the vehicle 1 by using the rotation speed of the vehicle wheel, and the unit of the driving speed may be expressed as [kph], and a moving distance per unit time (h) may be expressed as (km).

The storage 90 may store a variety of data related to the control of the vehicle 1. Particularly, the storage 90 may store information related to the driving speed, the driving distance and the driving time and driving information about the vehicle 1 according to an embodiment, and store the type and position information of an object detected by the image capturer 350. The storage 90 may store position information and speed information of the object detected by the image capturer 350 or the sensor 200, coordinate information of moving object that is changed in real time, and information about the relative distance and the relative speed between the vehicle 1 and the object.

In addition, the storage 90 may store data related to an equation and a control algorithm to control the vehicle 1 according to an embodiment, and the controller 100 may transmit a control signal controlling the vehicle 1 according to the equation and the control algorithm.

The storage 90 may be implemented by using at least one of a non-volatile memory element, e.g., a cache, a Read Only Memory ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage 90 is not limited thereto. The storage 90 may be a memory that is implemented by a separate memory chip from the aforementioned processor related to the controller 100 or the storage 90 may be implemented by a processor and a single chip.

Referring to FIGS. 1 to 4 again, at least one controller 100 may be provided in the vehicle 1. The controller 100 may perform an electronic control about each component related to the operation of the vehicle 1.

When the bicycle 2 moves toward the driving lane (A1) of the vehicle 1 in the transverse direction, the controller 100 may determine an expected collision position and a time to collision between the bicycle 2 and the vehicle 1, based on the driving speed of the vehicle 1 and the moving speed and position information of the bicycle 2 that is detected by the sensor 200, and the controller 100 may variably apply a collision avoidance control strategy configured to control the speed of the vehicle 1, based on the determined expected collision position and time to collision.

That is, the controller 100 may determine a longitudinal driving time ($t_y$) which is taken for the vehicle 1 to drive to the bicycle 2 detected by the sensor 200. Based on the determined longitudinal driving time ($t_y$) and the transverse moving time of the bicycle 2, the controller 100 may transmit a deceleration avoidance control signal configured to gradually reduce the driving speed of the vehicle 1 so that the vehicle 1 is stopped before colliding with the bicycle, or a cross avoidance control signal configured to instantaneously reduce the driving speed of the vehicle 1 to temporarily stop the vehicle 1 until the bicycle 2 escapes from the driving lane (A1) of the vehicle 1.

It may be possible that the vehicle 1 is stopped before colliding with the bicycle 2 by gradually reducing the driving speed of the vehicle 1 according to the time to collision or the expected collision position between the vehicle 1 and the bicycle 2, and also it may be possible to avoid the collision between the vehicle 1 and the bicycle 2 by allowing the bicycle 2 to be escaped from the driving lane (A1) of the vehicle 1 during the vehicle 1 is temporarily stopped, by instantaneously reducing the driving speed of the vehicle 1.

Hereinafter a method for controlling the vehicle will be described wherein the method is configured to determine that the bicycle 2 moves across the driving lane (A1) for how long time with how much a degree of overlap, based on the longitudinal driving time ($t_y$) of the vehicle 1 and the transverse moving time of the bicycle 2, when the bicycle 2 moves across the driving lane (A1) of the vehicle 1 in the transverse direction, and configured to variably apply the collision avoidance control strategy based on the determination.

Figure 6:
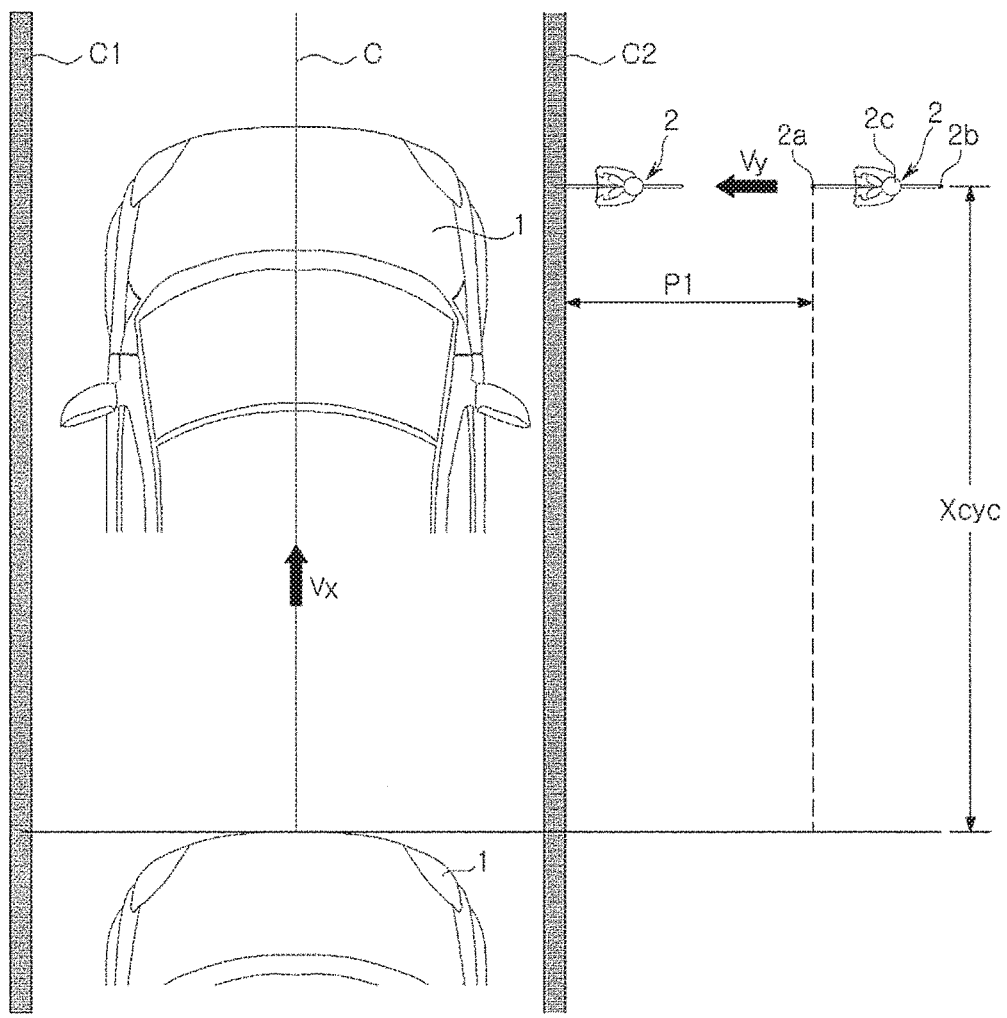
FIG. 6 is a conceptual diagram illustrating a control method in a case in which the bicycle does not enter the driving lane during the vehicle drives in the driving lane according to an embodiment of the present disclosure.

FIG. 6 is a conceptual diagram illustrating a control method in a case in which the bicycle does not enter the driving lane during the vehicle drives in the driving lane according to an embodiment of the present disclosure.

Referring to FIG. 6, when the vehicle 1 drives the longitudinal moving distance ($X_{cyc}$) to the bicycle 2 at the speed of $V_x$, the longitudinal driving time ($t_y$) of the vehicle 1 may be determined by using an equation of $t_y = X_{cyc}/V_x$.

As mentioned above, when the bicycle 2 moves toward the driving lane (A1) in the transverse direction, the sensor 200 may acquire information about the transverse distance from the bicycle 2 to the driving lane (A1), and the sensor 200 may acquire a distance in which the bicycle 2 moves in the transverse direction until the front portion (2a) of the bicycle 2 is placed in the right lane line (C2) of the driving lane (A1) until entering the driving lane (A1), as the first moving distance (P1).

The controller 100 may determine a period of time, in which the bicycle 2 moves in the transverse direction from a point of time when the sensor 200 detects the bicycle 2 until the front portion (2a) of the bicycle 2 enters the driving lane (A1) of the vehicle 1, as a first moving time ($t_1$), and when a transverse moving speed of the bicycle 2 is $V_y$, an equation of $t_1 = P1/V_y$ may be established.

The controller 100 may determine a collision time between the vehicle 1 and the bicycle 2 by comparing the longitudinal driving time ($t_y$) of the vehicle 1 with the first moving time ($t_1$) of the bicycle 2.

When the longitudinal driving time ($t_y$) of the vehicle 1 is shorter than the first moving time ($t_1$) of the bicycle 2, it may represent that the front portion (2a) of the bicycle 2 does not enter the driving lane (A1) of the vehicle 1 and thus the front portion (2a) of the bicycle 2 does not pass through the right lane line (C2) of the driving lane (A1) for a period of time in which the vehicle 1 moves the longitudinal moving distance ($X_{cyc}$) to the bicycle 2, and thus the controller 100 may determine that the vehicle 1 will not collide with the bicycle 2.

As illustrated in FIG. 6, since the vehicle 1 passes the bicycle 2, the collision between the vehicle 1 and the bicycle 2 may not occur and thus the controller 100 may not transmit a signal controlling the driving speed of the vehicle 1 for avoiding the collision between the vehicle 1 and the bicycle 2.

Figure 7:
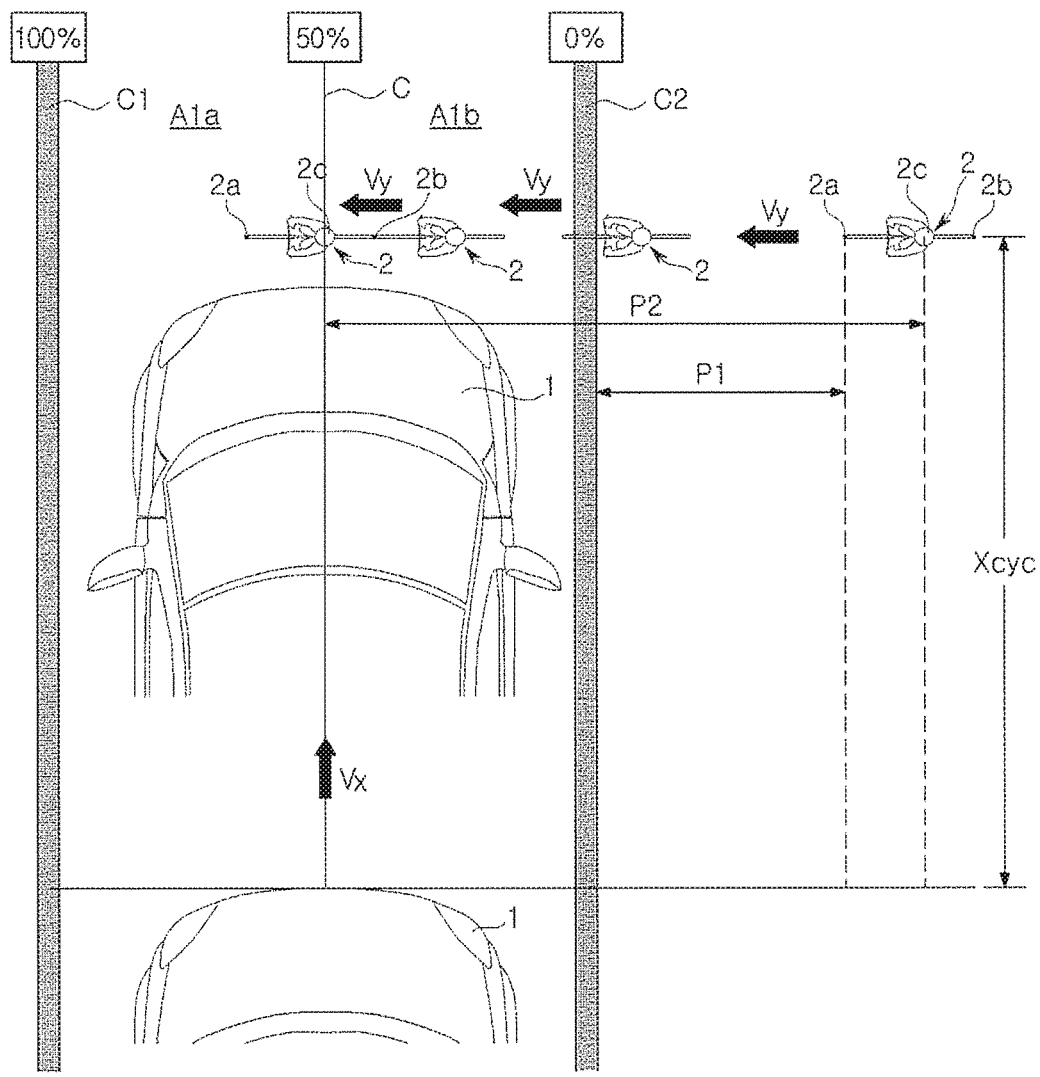
FIG. 7 is a conceptual diagram illustrating a collision avoidance control method in a case in which the bicycle enters the driving lane during the vehicle drives in the driving lane according to an embodiment of the present disclosure.

FIG. 7 is a conceptual diagram illustrating a collision avoidance control method in a case in which the bicycle enters the driving lane during the vehicle drives in the driving lane according to an embodiment of the present disclosure.

Referring to FIG. 7, when the vehicle 1 drives the longitudinal moving distance ($X_{cyc}$) to the bicycle 2 at the speed of $V_x$, the longitudinal driving time ($t_y$) of the vehicle 1 may be determined by using the equation of $t_y = X_{cyc}/V_x$.

In addition, when the bicycle 2 moves toward the driving lane (A1) in the transverse direction, the sensor 200 may acquire information about the transverse distance from the bicycle 2 to the driving lane (A1), and the sensor 200 may acquire a distance in which the bicycle 2 moves in the transverse direction until the driver position (2C) of the bicycle 2 is placed in the center line (C) with respect to the front surface portion of the vehicle 1, as the second moving distance (P2).

The controller 100 may determine a period of time, in which the bicycle 2 moves in the transverse direction from a point of time when the sensor 200 detects the bicycle 2 until the driver position (2C) of the bicycle 2 is placed in the center line (C) with respect to the front surface portion of the vehicle 1, as a second moving time ($t_2$), and when a transverse moving speed of the bicycle 2 is $V_y$, an equation of $t_2 = P2/V_y$ may be established.

The controller 100 may determine a collision time between the vehicle 1 and the bicycle 2 by comparing the longitudinal driving time ($t_y$) of the vehicle 1 with the second moving time ($t_2$) of the bicycle 2.

As illustrated in FIG. 7, when the bicycle 2 moves in the transverse direction and then enters the driving lane (A1), a distance, in which the driver of the bicycle 2 moves in the transverse direction until the driver position (2C) of the bicycle 2 is placed in the center line (C), may be represented by how far the driver position (2C) of the bicycle 2 moves across the driving lane (A1) in the transverse direction in the driving lane (A1), and hereinafter it will be described by defining it as a degree of overlap in which the bicycle 2 drives in the driving lane (A1).

That is, as illustrated in FIG. 7, when the bicycle 2 moves from the right side to the left side with respect to the driving lane (A1), the right lane line (C2) of the driving lane (A1) may be defined as 0% (zero) overlap, the position of the center line (C) with respect to the front surface portion of the vehicle 1 may be defined as 50% overlap, and the left lane line (C1) of the driving lane (A1) may be defined as 100% overlap.

The driver of the bicycle 2 may enter the driving lane (A1) by driving toward the right lane line (C2) of the driving lane (A1), i.e., 0% overlap, in the transverse direction, and when the driver position (2C) of the bicycle 2 is placed in the center line (C) since the bicycle 2 passes through the right area (A1b) of the driving lane (A1), the controller 100 may determine that the bicycle 2 drives by overlapping the driving lane (A1) by 50% in the transverse direction.

Therefore, in a state in which the bicycle 2 drives in the transverse direction by overlapping the driving lane (A1) by equal to or less than 50%, when it is estimated that the collision between the vehicle 1 and the bicycle 2 occurs, the controller 100 may transmit the deceleration avoidance control signal configured to reduce the driving speed of the vehicle 1 to stop the vehicle 1 before colliding with the bicycle 2.

For this, the controller 100 may estimate the collision between the vehicle 1 and the bicycle 2 by comparing the longitudinal driving time ($t_y$) of the vehicle 1 with the transverse moving time of the bicycle 2.

That is, when the longitudinal driving time ($t_y$) of the vehicle 1 exceeds the first moving time ($t_1$) and is equal to or less than the second moving time ($t_2$), it may represent that the bicycle 2 drives in the transverse direction and then the front portion (2a) of the bicycle 2 enters the right lane line (C2) of the driving lane (A1) until the driver position (2C) of the bicycle 2 is identical to the center line (C) during the vehicle 1 drives the longitudinal distance ($X_{cyc}$) to the bicycle 2, and thus the controller 100 may estimate that the vehicle 1 will collide with the bicycle 2 in the driving lane (A1).

When the collision between the vehicle 1 and the bicycle 2 is estimated to occur, the controller 100 may transmit the deceleration avoidance control signal configured to reduce the driving speed of the vehicle 1 and then the speed regulator 70 may gradually reduce the driving speed of the vehicle 1 and then finally stop the driving of the vehicle 1 in response to the transmitted control signal.

A point of time when the driving of the vehicle 1 is completely stopped may vary according to a relative speed between the vehicle 1 and the bicycle 2 based on the driving speed of the vehicle 1 and the moving speed of the bicycle 2, and according to a relative distance between the vehicle 1 and the bicycle 2. That is, since the time to collision (TTC) varies according to the relative speed and the relative distance between the vehicle 1 and the bicycle 2, and thus the controller 100 may calculate the time to collision between the vehicle 1 and 2 in the movement and then gradually reduce the driving speed of the vehicle 1 based on the calculated time to collision.

Figure 8:
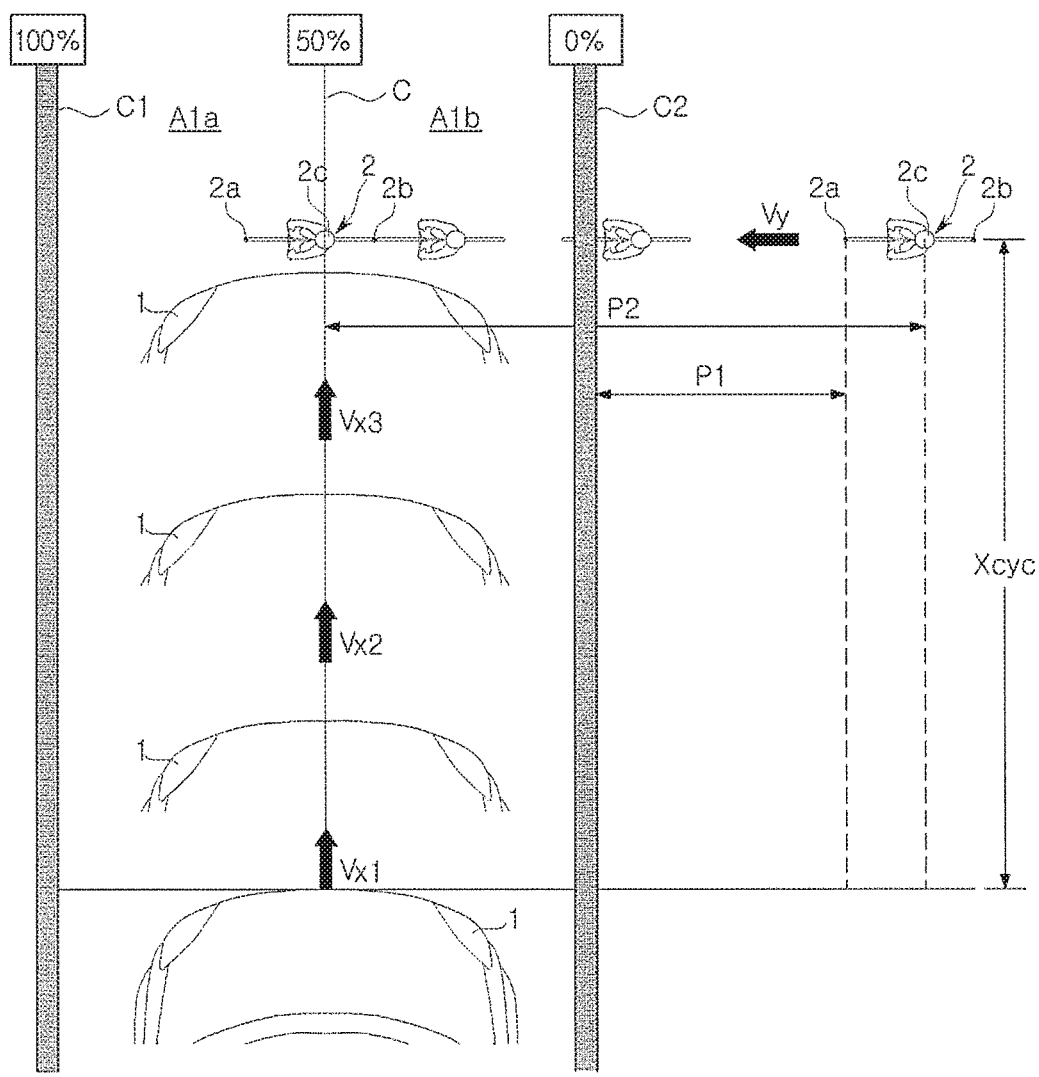
FIG. 8 is a view illustrating the vehicle in which the driving speed thereof is gradually reduced by the deceleration avoidance control according to an embodiment of the present disclosure.

FIG. 8 is a view illustrating the vehicle in which the driving speed thereof is gradually reduced by the deceleration avoidance control according to an embodiment of the present disclosure.

Referring to FIG. 8, when the controller 100 transmits the deceleration avoidance control signal, the driving speed of the vehicle 1 may be gradually reduced based on the calculated time to collision between the vehicle 1 and the bicycle 2.

That is, in a state in which the bicycle 2 drives toward the driving lane (A1) in the transverse direction during the bicycle 2 enters the driving lane (A1) until the driver position (2C) of the bicycle 2 is identical to the center line (C), the vehicle 1 may drive in the driving lane (A1) and thus the relative speed and the relative distance between the vehicle 1 and the bicycle 2 may be changed.

When the time to collision between the vehicle 1 and the bicycle 2 becomes shorter since the bicycle 2 enters the driving lane (A1) during the vehicle 1 drives at the driving speed of $V_{X1}$, the controller 100 may gradually reduce the driving speed of the vehicle 1 to $V_{X2}$ and $V_{X3}$ based on a predetermined amount of deceleration.

For example, when a time to collision is 1.5 seconds since the vehicle 1 and the bicycle 2 are apart from by a certain distance, the controller 100 may transmit a collision warning signal about the bicycle 2 without reducing the driving speed of the vehicle 1. When a time to collision between the vehicle 1 and the bicycle 2 is 1.2 seconds since the vehicle 1 keeps driving, the controller 100 may reduce the driving speed of the vehicle 1 with the amount of deceleration of 0.2 g, wherein g value is 9.8 m/s². In addition, when a time to collision between the vehicle 1 and the bicycle 2 is within 1 second since the vehicle 1 keeps driving despite of reducing the driving speed of the vehicle 1, the controller 100 may reduce the driving speed of the vehicle 1 with the amount of deceleration of 1 g.

Figure 9:
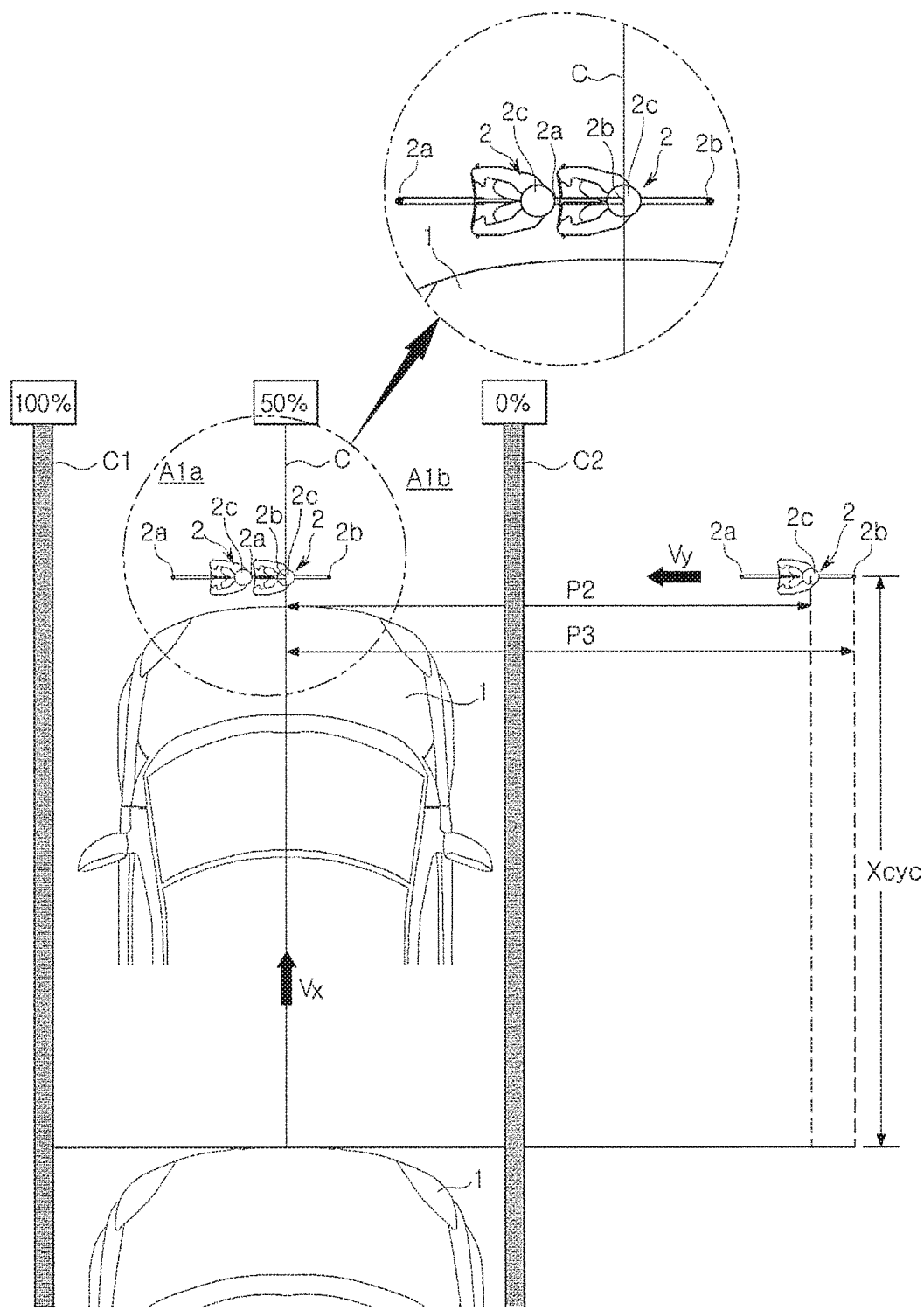
FIG. 9 is a conceptual diagram illustrating a collision avoidance control in a case in which the bicycle moves across the driving lane in a transverse direction during the vehicle drives in the driving lane according to an embodiment of the present disclosure.

FIG. 9 is a conceptual diagram illustrating a collision avoidance control in a case in which the bicycle moves across the driving lane in the transverse direction during the vehicle drives in the driving lane according to an embodiment of the present disclosure.

Referring to FIG. 9, when the vehicle 1 drives the longitudinal moving distance ($X_{cyc}$) to the bicycle 2 at the speed of $V_x$, the longitudinal driving time ($t_y$) of the vehicle 1 may be determined by using the equation of $t_y = X_{cyc}/V_x$.

In addition, when the bicycle 2 moves across the driving lane (A1) in the transverse direction, the sensor 200 may acquire information about the transverse distance from the bicycle 2 to the driving lane (A1), and the sensor 200 may acquire a distance in which the bicycle 2 drives in the transverse direction until the driver position (2c) of the bicycle 2 is placed in the center line (C) with respect to the front surface portion of the vehicle 1 in the transverse direction, as the second moving distance (P2).

In addition, the sensor 200 may acquire a distance in which the bicycle 2 drives in the transverse direction until the rear portion (2b) of the bicycle 2 is placed in the center line (C) with respect to the front surface portion of the vehicle 1, as the third moving distance (P3).

The controller 100 may determine a period of time, in which the bicycle 2 moves in the transverse direction from a point of time when the sensor 200 detects the bicycle 2 until the driver position (2c) of the bicycle 2 is placed in the center line (C), as the second moving time ($t_2$), and when the transverse moving speed of the bicycle 2 is $V_y$, the equation of $t_2=P2/V_y$ may be established.

The controller 100 may determine a period of time, in which the bicycle 2 moves in the transverse direction from a point of time when the sensor 200 detects the bicycle 2 until the rear portion (2b) of the bicycle 2 placed in the center line (C), as a third moving time ($t_3$), and when the transverse moving speed of the bicycle 2 is $V_y$, an equation of $t_3=P3/V_y$ may be established.

The controller 100 may determine a collision time between the vehicle 1 and the bicycle 2 by comparing the longitudinal driving time ($t_y$) of the vehicle 1 with the second moving time ($t_2$) and the third moving time ($t_3$) of the bicycle 2.

As illustrated in FIG. 9, when the bicycle 2 moves across the driving lane (A1) in the transverse direction until the rear portion (2b) of the bicycle 2 is placed in the center line (C), the controller 100 may determine that the bicycle 2 drives in the transverse direction by overlapping the driving lane (A1) by equal to or more than 50%. In this case, while the bicycle 2 drives in the transverse direction by overlapping the driving lane (A1) by equal to or more than 50%, an entire of the bicycle 2 may be placed in the driving lane (A1).

Therefore, when the collision between the vehicle 1 and the bicycle 2 is estimated to occur since the entire area of the bicycle 2 is placed in the driving lane (A1) while the bicycle 2 drives in the transverse direction by overlapping the driving lane (A1) by equal to or more than 50%, the controller 100 may transmit the deceleration avoidance control signal configured to stop the vehicle 1 by reducing the driving speed of the vehicle 1 before colliding with the bicycle 2.

For this, the controller 100 may estimate the collision between the vehicle 1 and the bicycle 2 by comparing the longitudinal driving time ($t_y$) of the vehicle 1 with the transverse moving time of the bicycle 2.

That is, when the longitudinal driving time ($t_y$) of the vehicle 1 exceeds the second moving time ($t_2$) and is equal to or less than the third moving time ($t_3$), it may represent that the bicycle 2 enters the driving lane (A1) and drives in the transverse direction until the driver position (2c) of the bicycle 2 is placed in the center line (C), during the vehicle 1 drives the longitudinal distance ($X_{cyc}$) to the bicycle 2. Therefore the controller 100 may estimate that the vehicle 1 will collide with the bicycle 2 in a position that is equal to or further than a position of 50% overlap in the driving lane (A1).

Accordingly, the controller 100 may estimate that the bicycle 2 will collide with the bicycle 2 after the bicycle 2 drives the third moving distance (P3) in the transverse direction.

When the collision between the vehicle 1 and the bicycle 2 is estimated, the controller 100 may transmit the deceleration avoidance control signal configured to reduce the driving speed of the vehicle 1 and then the speed regulator 70 may gradually reduce the driving speed of the vehicle 1 and then finally stop the driving of the vehicle 1 in response to the transmitted control signal.

What the controller 100 gradually reduces the driving speed of the vehicle 1 has been described in FIG. 8, and thus a duplicated description will be omitted.

Figure 10:
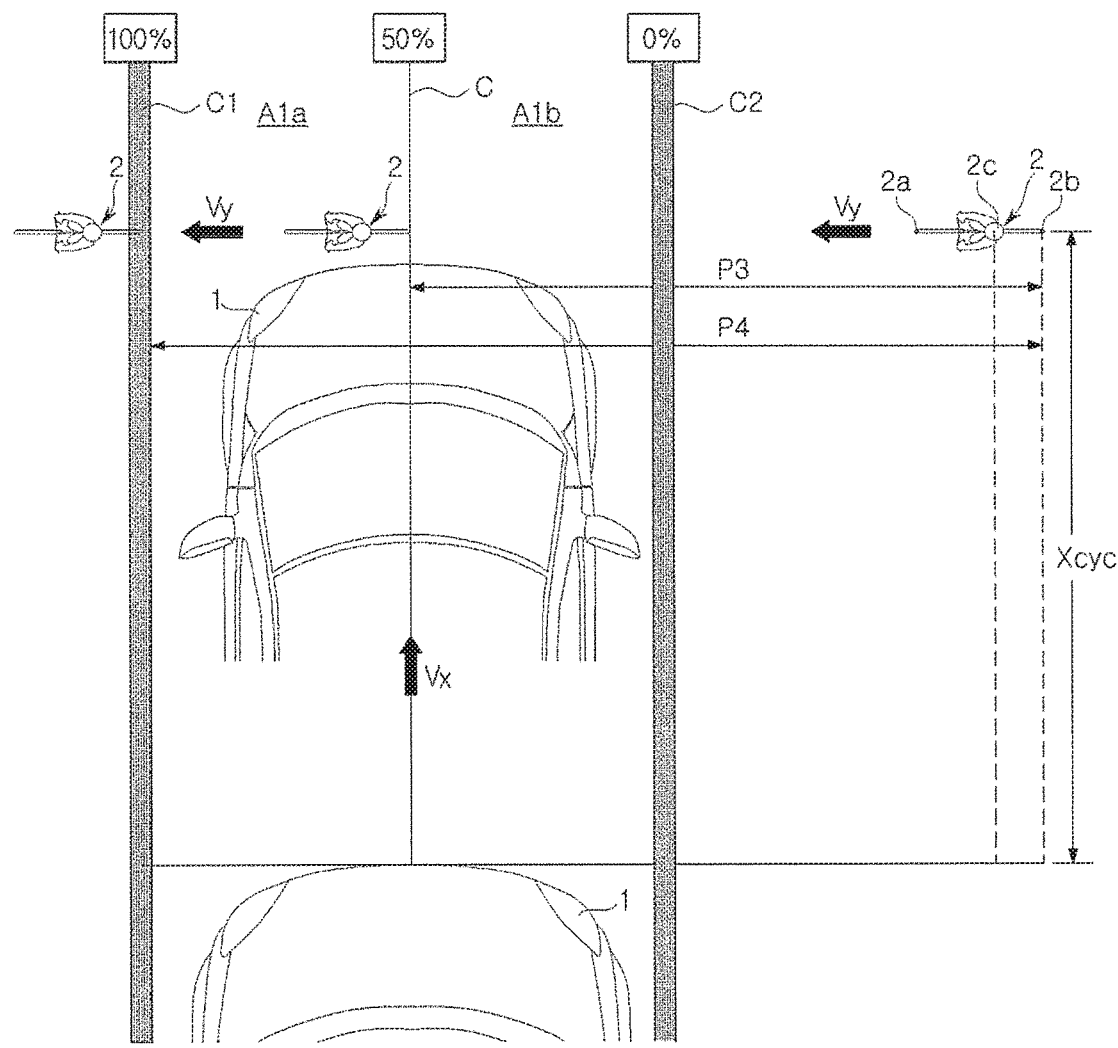
FIG. 10 is a conceptual diagram illustrating a collision avoidance control in a case in which the bicycle moves across the driving lane in a transverse direction during the vehicle drives the driving lane according to another embodiment of the present disclosure.

FIG. 10 is a conceptual diagram illustrating a collision avoidance control in a case in which the bicycle moves across the driving lane in the transverse direction during the vehicle drives the driving lane according to another embodiment of the present disclosure.

Referring to FIG. 10, when the vehicle 1 drives the longitudinal moving distance ($X_{cyc}$r) to the bicycle 2 at the speed of $V_x$, the longitudinal driving time ($t_y$) of the vehicle 1 may be determined by using the equation of $t_y=X_{cyc}/V_x$.

In addition, when the bicycle 2 moves across the driving lane (A1) in the transverse direction, the sensor 200 may acquire information about the transverse distance from the bicycle 2 to the driving lane (A1), and the sensor 200 may acquire a distance in which the bicycle 2 drives in the transverse direction until the rear portion (2b) of the bicycle 2 is placed in the center line (C) with respect to the front surface portion of the vehicle 1, as the third moving distance (P3).

In addition, the sensor 200 may acquire a distance in which the bicycle 2 drives in the transverse direction until the rear portion (2b) of the bicycle 2 is placed in the left lane line (C1) of the driving lane (A1) while escaping from the driving lane (A1) of the vehicle 1, as the fourth moving distance (P4).

The controller 100 may determine a period of time, in which the bicycle 2 moves in the transverse direction from a point of time when the sensor 200 detects the bicycle 2 until the rear portion (2b) of the bicycle 2 is placed in the center line (C), as the third moving time ($t_3$), and when the transverse moving speed of the bicycle 2 is $V_y$, an equation of $t_3=P3/V_y$ may be established.

The controller 100 may determine a period of time, in which the bicycle 2 moves in the transverse direction from a point of time when the sensor 200 detects the bicycle 2 until the rear portion (2b) of the bicycle 2 is placed in the left lane line (C1) of the driving lane (A1), as a fourth moving time ($t_4$), and when the transverse moving speed of the bicycle 2 is $V_y$, an equation of $t_4=P4/V_y$ may be established.

The controller 100 may determine a collision time between the vehicle 1 and the bicycle 2 by comparing the longitudinal driving time ($t_y$) of the vehicle 1 with the third moving time ($t_3$) and the fourth moving time ($t_4$) of the bicycle 2.

As illustrated in FIG. 10, when the bicycle 2 moves across the driving lane (A1) in the transverse direction until the rear portion (2b) of the bicycle 2 is placed in the left lane line (C1) of the driving lane (A1), the controller 100 may determine that the bicycle 2 drives in the transverse direction by overlapping the driving lane (A1) by equal to or more than 50%.

In this case, although the bicycle 2 drives in the transverse direction by overlapping the driving lane (A1) by equal to or more than 50%, a part of the entire area of the vehicle 1 may be placed in the driving lane (A1) and a part of the entire area of the vehicle 1 may be placed out of the driving lane (A1), which is different from what illustrated in FIG. 9. That is, since the bicycle 2 drives in the left area (A1a) in the transverse direction and then escapes from the driving lane (A1), only a part of the bicycle 2 may be placed in the driving lane (A1).

When the collision between the vehicle 1 and the bicycle 2 is estimated since the part of the entire area of the bicycle 2 is placed in the driving lane (A1) while the bicycle 2 drives in the transverse direction by overlapping the driving lane (A1) by equal to or more than 50%, the controller 100 may transmit the cross avoidance control signal configured to temporarily stop the vehicle 1 by instantaneously reducing the driving speed of the vehicle 1.

For this, the controller 100 may estimate the collision between the vehicle 1 and the bicycle 2 by comparing the longitudinal driving time ($t_y$) of the vehicle 1 with the transverse moving time of the bicycle 2.

That is, when the longitudinal driving time ($t_y$) of the vehicle 1 exceeds the third moving time ($t_3$) and is equal to or less than the fourth moving time ($t_4$), it may represent that the bicycle 2 enters the driving lane (A1) and drives in the transverse direction until the rear portion (2b) of the bicycle 2 passes the center line (C) and placed in the left lane line (C1), during the vehicle 1 drives the longitudinal distance ($X_{cyc}$) to the bicycle 2. Therefore, the controller 100 may estimate that the vehicle 1 will collide with the part of the bicycle 2 in a position that is overlapping by equal to or more than 50% in the driving lane (A1).

Accordingly, the controller 100 may estimate that the bicycle 2 will collide with the bicycle 2 after the bicycle 2 drives the fourth moving distance (P4) in the transverse direction.

When the collision between the vehicle 1 and the bicycle 2 is estimated, the controller 100 may transmit the cross avoidance control signal configured to temporarily stop the vehicle 1 by instantaneously reducing the driving speed of the vehicle 1 and then the speed regulator 70 may reduce the driving speed of the vehicle and then temporarily stop the driving of the vehicle 11 in response to the transmitted control signal.

In FIG. 9, since the entire area of the bicycle 2 is placed in the driving lane (A1) although the bicycle 2 moves in the transverse direction by overlapping the driving lane (A1) by equal to or more than 50%, the controller 100 may transmit the deceleration avoidance control signal configured to stop the vehicle 1 by gradually reducing the speed of the vehicle 1 for the collision avoidance control of the vehicle 1.

In contrast, in FIG. 10, since the part of the entire area of the bicycle 2 is placed in the driving lane (A1) although the bicycle 2 moves in the transverse direction by overlapping the driving lane (A1) by equal to or more than 50%, the crossing avoidance control, which is configured to avoid the collision by allowing the bicycle 2 to escape from the driving lane (A1) by instantaneously stopping the vehicle 1, may be more efficient than stopping the vehicle 1 by reducing the driving speed of the vehicle 1.

As mentioned above, the controller 100 may transmit the cross avoidance control signal, wherein the cross avoidance control may be performed by instantaneously reducing the driving speed of the vehicle 1 with the amount of deceleration of approximately 0.2 g within the time to collision between the vehicle 1 and the bicycle 2, which is different from the deceleration avoidance control configured to gradually reduce the amount of deceleration, as illustrated in FIG. 8.

That is, when the speed regulator 70 stops the vehicle 1 by instantaneously reducing the driving speed of the vehicle 1 in response to the cross avoidance control signal that is transmitted by the controller 100, the bicycle 2 moving in the longitudinal direction may be escaped from the driving lane (A1) so that the collision between the vehicle 1 and the bicycle 2 may be prevented.

In the case of FIG. 10, it may be possible to avoid the collision between the vehicle 1 and the bicycle 2 by transmitting the deceleration avoidance control signal according to the determination of the controller 100, wherein the deceleration avoidance control signal may be transmitted based on the time to collision avoidance between the vehicle 1 and the bicycle 2, which is calculated by the controller 100.

Figure 11:
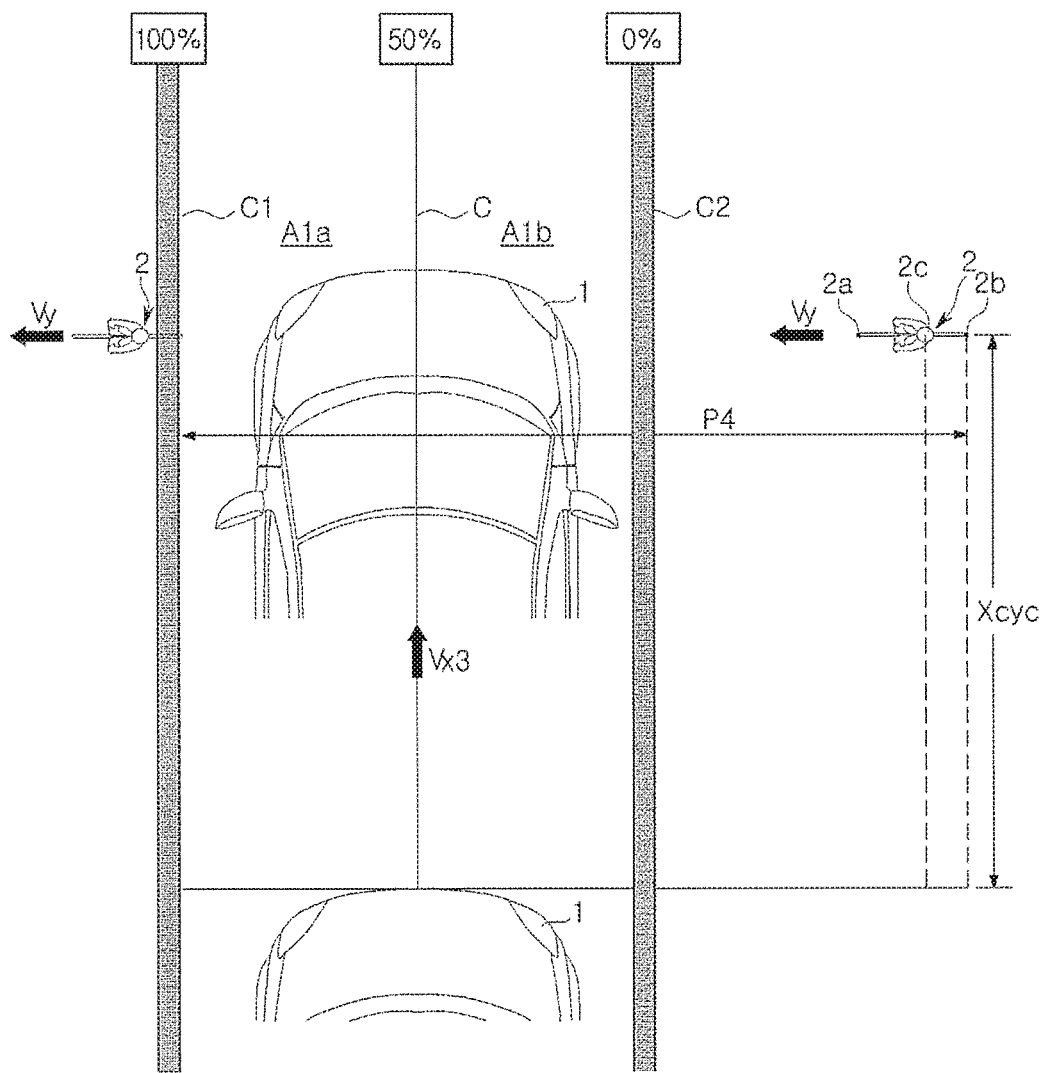
FIG. 11 is a conceptual diagram illustrating a collision avoidance control in a case in which the bicycle escapes from the driving lane before the vehicle drives the longitudinal moving distance according to an embodiment of the present disclosure.

FIG. 11 is a conceptual diagram illustrating a collision avoidance control in a case in which the bicycle escapes from the driving lane before the vehicle drives the longitudinal moving distance according to an embodiment of the present disclosure.

Referring to FIG. 11, when the vehicle 1 drives the longitudinal moving distance ($X_{cyc}$) to the bicycle 2 at the speed of $V_x$, the longitudinal driving time ($t_y$) of the vehicle 1 may be determined by using the equation of $t_y = X_{cyc}/V_x$.

In addition, when the bicycle 2 moves across the driving lane (A1) in the transverse direction, the sensor 200 may acquire information about the transverse distance from the bicycle 2 to the driving lane (A1), and the sensor 200 may acquire a distance in which the rear portion (2b) of the bicycle 2 is moved to the left lane line (C1) of the driving lane (A1) in the transverse direction while escaping from the driving lane (A1) of the vehicle 1, as a fourth moving distance (P4).

As mentioned above, the controller 100 may determine the fourth moving time ($t_4$), and the equation of $t_4 = P4/V_y$ may be established.

The controller 100 may determine a collision time between the vehicle 1 and the bicycle 2 by comparing the longitudinal driving time ($t_y$) of the vehicle 1 with the fourth moving time ($t_4$) of the bicycle 2.

When the longitudinal driving time ($t_y$) of the vehicle 1 longer than the fourth moving time ($t_4$), it may represent that the bicycle 2 moves across the driving lane (A1) and then escapes from the driving lane (A1) before the vehicle 1 drives the longitudinal moving distance ($X_{cyc}$), and thus the controller 100 may determine that the vehicle 1 will not collide with the bicycle 2.

As illustrated in FIG. 11, since the bicycle 2 moves across the driving lane (A1) and then escapes from the driving lane (A1) in the longitudinal direction before the vehicle 1 drives to the position of the bicycle 2, the vehicle 1 and the bicycle 2 may not collide with each other and thus the controller 100 may not transmit the control signal, which is configured to control the driving speed of the vehicle 1 for avoiding the collision between the vehicle 1 and the bicycle 2.

Figure 12:
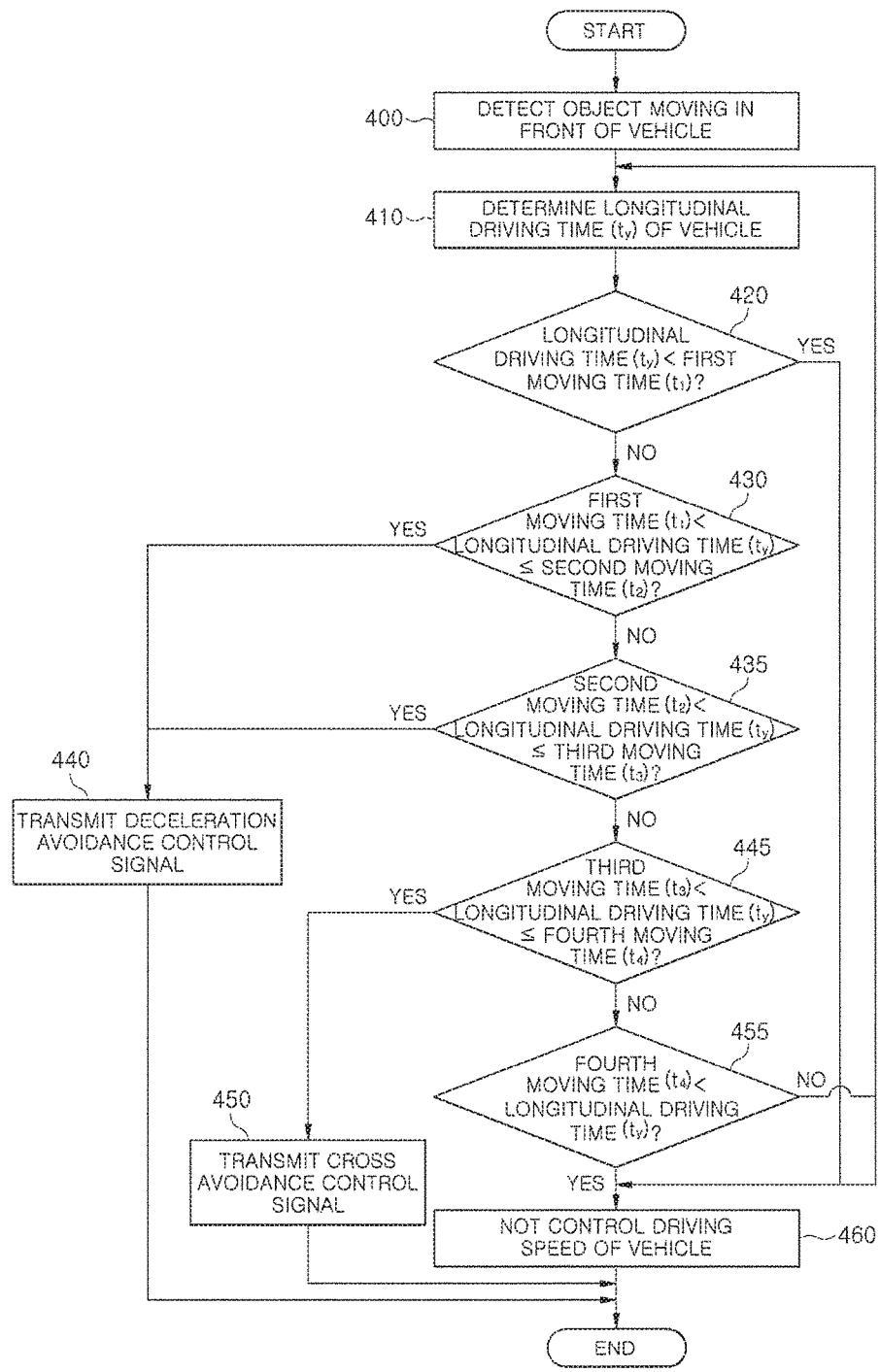
FIG. 12 is a flowchart illustrating a method for controlling the vehicle according to an embodiment of the present disclosure.

FIG. 12 is a flowchart illustrating a method for controlling the vehicle according to an embodiment of the present disclosure.

Referring to FIG. 12, the sensor 200 may detect an object moving in front of the vehicle 1 (400). According to an embodiment, the method for controlling a vehicle will be described with an example in which the object is a bicycle, and thus the sensor 200 may detect the bicycle moving in front of the vehicle 1.

The controller 100 may determine the longitudinal driving time ($t_y$) based on the longitudinal moving distance ($X_{cyc}$) of the vehicle 1 and the driving speed of $V_x$(410), and determine the first moving time ($t_1$) of the bicycle 2 based on the transverse moving speed of the bicycle 2 ($V_y$) and the first moving distance (P1).

The controller 100 may determine the second moving time ($t_2$) of the bicycle 2 based on the transverse moving speed of the bicycle 2 ($V_y$) and the second moving distance (P2), and determine the third moving time ($t_3$) of the bicycle 2 based on the transverse moving speed of the bicycle 2 ($V_y$) and the third moving distance (P3). The controller 100 may determine the fourth moving time ($t_4$) of the bicycle 2 based on the transverse moving speed of the bicycle 2 ($V_y$) and the fourth moving distance (P4).

The controller 100 may determine a collision time between the vehicle 1 and the bicycle 2 by comparing the longitudinal driving time ($t_y$) of the vehicle 1 with the first moving time ($t_1$) of the bicycle 2 to the fourth moving time ($t_4$) of the bicycle 2.

The controller 100 may compare the longitudinal driving time ($t_y$) of the vehicle 1 with the first moving time ($t_1$) of the bicycle 2 (420), and when it is determined that the longitudinal driving time ($t_y$) of the vehicle 1 is shorter than the first moving time ($t_1$) of the bicycle 2, the controller 100 may determine that the vehicle 1 will not collide with the bicycle 2. Therefore, the controller 100 may not transmit the signal that is configured to control the driving speed of the vehicle 1 to avoid the collision between the vehicle 1 and the bicycle 2 (460).

The controller 100 may compare the longitudinal driving time ($t_y$) of the vehicle 1 with the first moving time ($t_1$) of the bicycle 2 and the second moving time ($t_2$) of the bicycle 2 (430), and when it is determined that the longitudinal driving time ($t_y$) of the vehicle 1 exceeds the first moving time ($t_1$) and is equal to or less than the second moving time ($t_2$), the controller 100 may estimate that the vehicle 1 will collide with the bicycle 2 in the driving lane (A1).

Therefore, the controller 100 may transmit the deceleration avoidance control signal configured to reducing the driving speed of the vehicle 1 (440), and the speed regulator 70 may gradually reduce the driving speed of the vehicle 1 and then finally stop the driving of the vehicle 1 in response to the transmitted control signal.

The controller 100 may compare the longitudinal driving time ($t_y$) of the vehicle 1 with the second moving time ($t_2$) of the bicycle 2 and the third moving time ($t_3$) of the bicycle 2 (435), and when it is determined that the longitudinal driving time ($t_y$) of the vehicle 1 exceeds the second moving time ($t_2$) and is equal to or less than the third moving time ($t_3$), the controller 100 may estimate that the vehicle 1 will collide with the bicycle 2 in a position that is equal to or further than a position of 50% overlap in the driving lane (A1).

Therefore, the controller 100 may transmit the deceleration avoidance control signal configured to reducing the driving speed of the vehicle 1 (440), and the speed regulator 70 may gradually reduce the driving speed of the vehicle and then finally stop the driving of the vehicle 11 in response to the transmitted control signal.

The controller 100 may compare the longitudinal driving time ($t_y$) of the vehicle 1 with the third moving time ($t_3$) of the bicycle 2 and the fourth moving time ($t_4$) of the bicycle 2 (445), and when it is determined that the longitudinal driving time ($t_y$) of the vehicle 1 exceeds the third moving time ($t_3$) and is equal to or less than the fourth moving time ($t_4$), the controller 100 may estimate that the vehicle 1 will collide with a part of the bicycle 2 in a position that is equal to or further than a position of 50% overlap in the driving lane (A1).

Therefore, the controller 100 may transmit the cross avoidance control signal configured to temporarily stop the vehicle 1 by instantaneously reducing the driving speed of the vehicle 1 (450) and the speed regulator 70 may reduce the driving speed of the vehicle 1 so that the vehicle 1 is temporarily stopped in response to the transmitted control signal. When the speed regulator 70 stops the vehicle 1 by instantaneously reducing the driving speed of the vehicle 1 in response to the cross avoidance control signal transmitted by the controller 100, the bicycle 2 moving in the transverse direction may be escaped from the driving lane (A1) and thus the collision between the vehicle 1 and the bicycle 2 may be prevented.

The controller 100 may compare the longitudinal driving time ($t_y$) of the vehicle 1 with the fourth moving time ($t_4$) of the bicycle 2 (455), and when it is determined that the longitudinal driving time ($t_y$) of the vehicle 1 is longer than the fourth moving time ($t_4$), the controller 100 may determine that the vehicle 1 will not collide with the bicycle 2. In this case, the controller 100 may not transmit the signal that is configured to control the driving speed of the vehicle 1 to avoid the collision between the vehicle 1 and the bicycle 2 (460).

The disclosed embodiments may be implemented in the form of a recording medium that stores instructions executable by a computer. The instructions may be stored in the form of program code and may perform the operations of the embodiments disclosed by creating a program module when executed by a processor. The recording medium may be implemented in a non-transitory computer-readable recording medium.

The computer readable recording medium may include various kinds of recording medium in which an instruction decrypted by the computer system is stored. For example, the computer readable recording medium may include a Read Only Memory (ROM), a Random Access Memory (RAM), a magnetic tape, a magnetic disk, a flash memory, and an optical data storage device.

As is apparent from the above description, according to the proposed vehicle and method for controlling thereof, it may be possible to implement the stable and effective collision avoidance by variably applying the collision avoidance control strategy between the vehicle and a bicycle according to a time to collision and an expected collision position between the vehicle and the bicycle detected by the vehicle.

In addition, it may be possible to reduce controlled variables for the collision avoidance control by applying the control strategy when the object detected by the vehicle is a bicycle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a sensor configured to detect an object moving in front of the vehicle;
   a controller configured to determine a longitudinal driving time taken for the vehicle to drive to the object, and configured to transmit a deceleration avoidance control signal gradually reducing a driving speed of the vehicle so that the vehicle stops before colliding with the object or a cross avoidance control signal stopping the vehicle until the object escapes from a driving lane of the vehicle, based on the longitudinal driving time and a transverse moving time of the object; and
   a speed regulator configured to regulate the driving speed of the vehicle in response to the transmitted control signal,
   wherein the controller is further configured to:

determine an overlap ratio of the object moving across the driving lane of the vehicle based on the longitudinal driving time of the vehicle and the transverse moving time of the object; and transmit one of the deceleration avoidance control signal and the cross avoidance control signal based on the overlap ratio, wherein the overlap ratio is a ratio of a transverse moving distance of the object in the driving lane to a width of the driving lane.

2. The vehicle of claim 1, wherein the object is a bicycle.

3. The vehicle of claim 2, wherein the controller determines a first period of time, in which the bicycle moves in a transverse direction from when the bicycle is detected until a front portion of the bicycle enters the driving lane of the vehicle, as a first moving time.

4. The vehicle of claim 3, wherein the controller determines a second period of time, in which the bicycle moves in the transverse direction from when the bicycle is detected until a driver position of the bicycle is placed in a center of a front surface of the vehicle, as a second moving time.

5. The vehicle of claim 4, wherein the controller determines a third period of time, in which the bicycle moves in the transverse direction from when the bicycle is detected until a rear portion of the bicycle is placed in the center of the front surface of the vehicle, as a third moving time.

6. The vehicle of claim 5, wherein the controller determines a fourth period of time, in which the bicycle moves in the transverse direction from when the bicycle is detected until the rear portion of the bicycle escapes from the driving lane of the vehicle, as a fourth moving time.

7. The vehicle of claim 4, wherein the controller transmits the deceleration avoidance control signal when the determined longitudinal driving time of the vehicle exceeds the first moving time and is equal to or less than the second moving time.

8. The vehicle of claim 5, wherein the controller transmits the deceleration avoidance control signal when the determined longitudinal driving time of the vehicle exceeds the second moving time and is equal to or less than the third moving time.

9. The vehicle of claim 6, wherein the controller transmits the cross avoidance control signal when the determined longitudinal driving time of the vehicle exceeds the third moving time and is equal to or less than the fourth moving time.

10. The vehicle of claim 2, wherein the controller calculates a time to collision (TTC) between the vehicle and the bicycle and transmits the deceleration avoidance control signal gradually reducing the driving speed of the vehicle, based on the calculated time to collision.

11. The vehicle of claim 2, wherein the controller transmits the cross avoidance control signal configured to temporarily stop the vehicle with a predetermined amount of deceleration until the bicycle escapes from the driving lane of the vehicle.

12. The vehicle of claim 2, wherein the sensor comprises any one of a radar and a light detection and ranging (LiDAR), and acquires position information and speed information of the detected bicycle.

13. A method for controlling a vehicle, the method comprising:

detecting, by a sensor an object moving in front of the vehicle;

determining, by a controller, a longitudinal driving time taken for the vehicle to drive to the object;

determining, by the controller, an overlap ratio of the object moving across a driving lane of the vehicle based on the longitudinal driving time of the vehicle and a transverse moving time of the object;

transmitting, by the controller, a deceleration avoidance control signal configured to gradually reduce a driving speed of the vehicle so that the vehicle stops before colliding with the object or a cross avoidance control signal configured to stop the vehicle until the object escapes from the driving lane of the vehicle, based on the longitudinal driving time and the transverse moving time of the object; and regulating the driving speed of the vehicle in response to the transmitted control signal, wherein the transmitting of the deceleration avoidance control signal or the cross avoidance control signal transmits one of the deceleration avoidance control signal and the cross avoidance control signal based on the overlap ratio, wherein the overlap ratio is a ratio of a transverse moving distance of the object in the driving lane to a width of the driving lane.

14. The method of claim 13, wherein the object is a bicycle.

15. The method of claim 14, wherein a first period of time, in which the bicycle moves in the transverse direction from when the bicycle is detected until a front portion of the bicycle enters the driving lane of the vehicle, is determined as a first moving time.

16. The method of claim 15, wherein a second period of time, in which the bicycle moves in the transverse direction from when the bicycle is detected until a driver position of the bicycle is placed in the center of the front surface of the vehicle, is determined as a second moving time.

17. The method of claim 16, wherein a third period of time, in which the bicycle moves in the transverse direction from when the bicycle is detected until a rear portion of the bicycle is placed in the center of the front surface of the vehicle, is determined as a third moving time.

18. The method of claim 17, wherein a fourth period of time, in which the bicycle moves in the transverse direction from when the bicycle is detected until a rear portion of the bicycle escapes from the driving lane of the vehicle, is determined as a fourth moving time.

19. The method of claim 16, wherein the transmission of the deceleration avoidance control signal is performed by transmitting the deceleration avoidance control when the determined longitudinal driving time of the vehicle exceeds the first moving time and is equal to or less than the second moving time.

20. The method of claim 17, wherein the transmission of the deceleration avoidance control signal is performed by transmitting the deceleration avoidance control when the determined longitudinal driving time of the vehicle exceeds the second moving time and is equal to or less than the third moving time.

21. The method of claim 18, wherein the transmission of the cross avoidance control signal is performed by transmitting the cross avoidance control when the determined longitudinal driving time of the vehicle exceeds the third moving time and is equal to or less than the fourth moving time.

22. The method of claim 14, wherein the transmission of the deceleration avoidance control signal is performed by calculating a time to collision between the vehicle and the bicycle and transmitting the deceleration avoidance control signal configured to gradually reduce the driving speed of the vehicle based on the calculated time to collision.

23. The method of claim 14, wherein the transmission of the cross avoidance control signal is performed by transmitting the cross avoidance control signal configured to temporarily stop the vehicle with a predetermined amount of deceleration until the bicycle escapes from the driving lane of the vehicle.

24. The method of claim 14, wherein the detection of the object moving in front of the vehicle comprises acquiring position information and speed information of the detected bicycle.

* * * * *